United States Patent
Ogawa et al.

(10) Patent No.: US 8,592,050 B2
(45) Date of Patent: Nov. 26, 2013

(54) PISTON RING

(75) Inventors: Junpei Ogawa, Machida (JP); Takaaki Kondou, Yokohama (JP); Tomonori Miyazawa, Chigasaki (JP); Toyoki Iguchi, Yokohama (JP); Takuma Suzuki, Kawasaki (JP); Takeshi Makita, Saitama (JP); Katsuaki Ogawa, Saitama (JP); Takahiro Okazaki, Saitama (JP)

(73) Assignees: Nissan Motor Co., Ltd., Yokohama-shi (JP); Nippon Piston Ring Co., Ltd., Saitama-shi (JP)

( * ) Notice: Subject to any disclaimer, the term of this patent is extended or adjusted under 35 U.S.C. 154(b) by 605 days.

(21) Appl. No.: 12/397,027

(22) Filed: Mar. 3, 2009

(65) Prior Publication Data

US 2009/0226756 A1 Sep. 10, 2009

(30) Foreign Application Priority Data

Mar. 4, 2008 (JP) .................. 2008-053078
Dec. 15, 2008 (JP) .................. 2008-317984

(51) Int. Cl.
*B32B 15/04* (2006.01)
*B32B 15/18* (2006.01)
*C22C 38/22* (2006.01)
*C22C 38/44* (2006.01)

(52) U.S. Cl.
USPC ........... 428/667; 428/627; 428/628; 428/629; 428/634; 428/684; 428/687; 148/335; 420/105; 420/106; 420/112; 420/113

(58) Field of Classification Search
USPC ......... 428/450, 457, 687, 627, 626, 628, 629, 428/634, 666, 667, 684
See application file for complete search history.

(56) References Cited

U.S. PATENT DOCUMENTS

| 4,622,081 | A | 11/1986 | Stickels et al. |
| 6,048,625 | A | 4/2000 | Miura et al. |
| 6,213,474 | B1 | 4/2001 | Sameshima et al. |
| 2002/0005616 | A1 | 1/2002 | Kubota et al. |
| 2002/0175476 | A1* | 11/2002 | Chinou et al. ............ 277/440 |

FOREIGN PATENT DOCUMENTS

| DE | 199 11 962 A1 | 9/1999 |
| EP | 1 063 454 A2 | 6/2000 |

(Continued)

OTHER PUBLICATIONS

Alex Tabenkin, in "Quality 101: Surface Finish Measurement Basics," Sep. 2004, 2 pages, downloaded from www.qualitymag.com on Aug. 9, 2011.*

(Continued)

*Primary Examiner* — Michael La Villa
(74) *Attorney, Agent, or Firm* — Foley & Lardner LLP

(57) ABSTRACT

A piston ring includes: a refined steel including: carbon C in a range of 0.20% mass to 0.90% mass, silicon Si in a range of 0.10% mass to less than 0.60% mass, manganese Mn in a range of 0.20% mass to 1.50% mass, chromium Cr in a range of 0.30% mass to 2.00% mass, and a remnant including: iron Fe, and an unavoidable impurity. A parameter A calculated from the following expression (1) based on contents of the Si, Mn and Cr is 9.0 or less: parameter A=8.8 Si+1.6 Mn+1.7 Cr—expression (1). A parameter B calculated from the following expression (2) based on contents of the C, Si, Mn and Cr is 10.8 or more: parameter B=36 C+4.2 Si+3.8 Mn+4.5 Cr—expression (2).

8 Claims, 4 Drawing Sheets

(56) References Cited

FOREIGN PATENT DOCUMENTS

| | | |
|---|---|---|
| EP | 1 143 025 A1 | 1/2001 |
| GB | 614323 A | 12/1948 |
| JP | 60-215745 A | 10/1985 |
| JP | 63-140067 A | 6/1988 |
| JP | 63-216949 | 9/1988 |
| JP | 63-223147 | 9/1988 |
| JP | 63-223147 A | 9/1988 |
| JP | 63-303036 | 12/1988 |
| JP | 8-60297 A | 3/1996 |
| JP | 10-68049 A | 3/1998 |
| JP | 2001-294989 A | 10/2001 |
| JP | 2001-329345 A | 11/2001 |
| JP | 2002-194500 A | 7/2002 |
| JP | 2004-197807 A | 7/2004 |
| JP | 2005-344199 A | 12/2005 |
| JP | 2008-076132 A | 4/2008 |

OTHER PUBLICATIONS

Taktak et al., "High temperature wear and friction properties of duplex surface treated bearing steels", *Surface & Coatings Technology*, vol. 202, (2008), pp. 3367-3377.

Translation of Japanese Publication 2008-76132; Apr. 3, 2008, (37 pages).

Translation of Japanese Publication 2001-294989; Oct. 26, 2001, (22 pages).

JIS Handbook 1-1, Steels I, "Terms/Inspections and tests/Special-purpose steels/Castings and forgings/Others", 1999, (12 pages).

Metal Data Book, Revised second edition: Edited by *The Japan Institute of Metals*, Apr. 30, 1990, (18 pages).

Boegehold, A. et al., "The Selection of Steel for Hardenability", Metal Handbook, vol. 1-Properties and Selection: Irons, Steels, and High-Performance Alloys, *ASM International $10^{th}$ Ed*, 1990, pp. 189-224.

1992 SAE Handbook, vol. 1, "Materials", 1992, pp. 1-79.

JIS G 4801, "Spring Steels" *Japanese Standards Association*, Apr. 21, 1999, pp. 758-759.

$2^{nd}$ Edition Metal Data Book, *The Japan Institute of Metals*, Jan. 1984, pp. 375-381.

Letter of May 14, 2012, 6 pages.

Third Party Submission Under 37 C.F.R. § 1.99, Apr. 30, 2012, 5 pages.

Third Party Submissions dated May 12 and May 15, 2012, 2 pages.

Letter from Law Offices of Leydig, Voit & Mayer, Ltd. Dated Jul. 26, 2013, (documents included: Table A, Kurihara et al., Andersson et al., SAE).

* cited by examiner

FIG. 1A
FIG. 1B
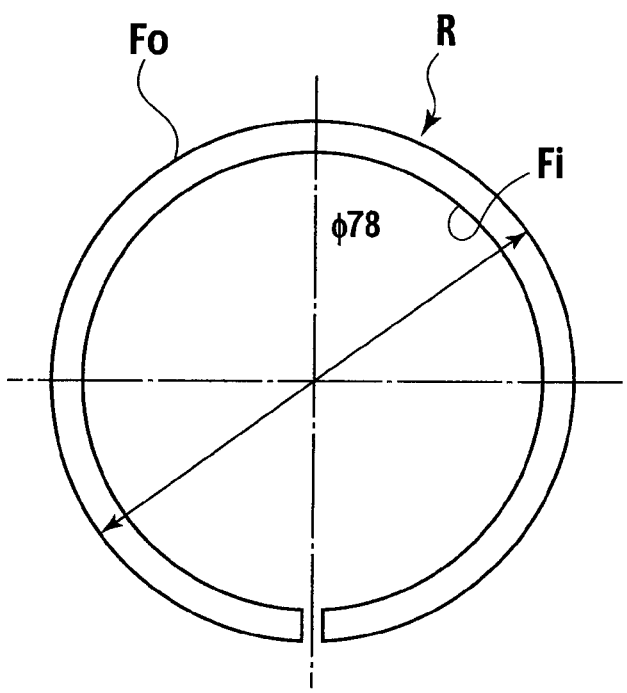
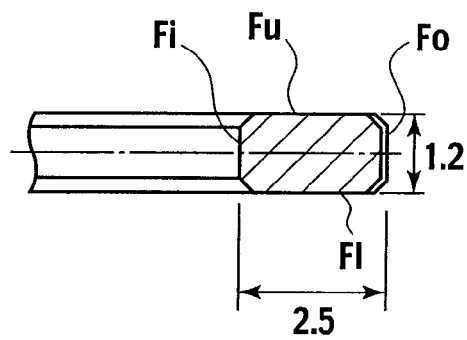

PISTON RING

BACKGROUND OF THE INVENTION

1. Field of the Invention

The preset invention relates to a piston ring mounted to a piston of an internal combustion engine such as the one for a motor vehicle, where the piston ring includes a refined steel (heat-treated steel) which is excellent in thermal conductivity and heat fatigue resistance. Especially, the present invention relates to the piston ring used preferably as top ring or second ring.

2. Description of the Related Art

Preferable properties of a piston ring for an internal combustion engine of a motor vehicle and the like include gas sealing and oil controllability.

For keeping the above preferable properties, the piston ring for internal combustion engine is required to have wear resistance, scuffing resistance, heat fatigue resistance and high fatigue strength.

A flake graphite cast iron material is used for a second ring among various piston rings for internal combustion engine, where the second ring is mounted in a position away from a top of the piston and is used under a relatively calm temperature environment.

Meanwhile, Japanese Patent Application Laid-Open No. 2001-294989 {=JP2001294989 (A)} discloses a top ring mounted in a position directly below a top of a piston and is thereby subjected to a high temperature environment such as 300° C. As such, for keeping heat fatigue resistance and preventing possible deterioration of the gas sealing and oil controllability, JP2001294989 (A) uses a large amount of elements such as Si, Mn, Cr and the like to be added to steel which is so developed as to improve its heat fatigue resistance.

Recently, for improving fuel economy (i.e., decreasing fuel consumption), it is required to increase compression ratio of engine, which necessarily leads to a higher temperature environment in a combustion chamber of the engine.

As such, a piston ring material for internal combustion engine is required to have such properties as i) heat transfer, i.e, relieving a heat input (which enters the piston) to a bore and thereby lowering temperature of the combustion chamber to thereby prevent knocking, and ii) heat fatigue resistance for keeping durability in high temperature environment.

Among the above, a piston ring for a second ring of internal combustion engine conventionally has such inconveniences as i) flake graphite cast iron being low in heat fatigue resistance and ii) oil controllability deactivated, thus increasing engine oil consumption.

Meanwhile, the piston ring as top ring conventionally uses i) a heat-resistant spring material having a typical example thereof including SWOCV-V which is specified by JIS G 3561 (valve spring oil-tempered wire), and ii) martensite-based stainless steel having a typical example thereof including SUS440C which is specified by JIS G 4308 (stainless steel wire rod), where JIS stands for Japanese Industrial Standards.

However, Si added in a large amount for securing heat fatigue resistance greatly decreases thermal conductivity, thereby losing the heat transfer {i.e., relieving a heat input (which enters the piston) to a bore and thereby lowering temperature of the combustion chamber to thereby prevent knocking} which is required of the piston ring for internal combustion engine. As such, the fuel economy is deteriorated.

SUMMARY OF THE INVENTION

It is an object of the present invention to provide a piston ring which has an excellent thermal conductivity and an excellent heat fatigue resistance and is applicable to an oil ring or a second ring of an internal combustion engine of a motor vehicle and the like. It is another object of the present invention to provide a piston ring which has more excellent heat fatigue resistance and is applicable to a top ring of the internal combustion engine of the motor vehicle and the like.

According to a first aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, chromium Cr in a range of 0.30% mass to 2.00% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to a second aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, chromium Cr in a range of 0.30% mass to 2.00% mass, at least one selected from the group consisting of: molybdenum Mo in a range of 0.1% mass to 0.4% mass, vanadium V in a range of 0.05% mass to 0.40% mass, niobium Nb in a range of 0.01% mass to 0.06% mass, and titanium Ti in a range of 0.01% mass to 0.06% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to a third aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, chromium Cr in a range of 0.30% mass to 2.00% mass, at least one of: nickel Ni in a range of 0.40% mass to 2.50% mass, and boron B in a range of 0.0010% mass to 0.0030% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to a fourth aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, phosphor P in a range of 0.01% mass to 0.05% mass, chromium Cr in a range of 0.30% mass to 2.00% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to a fifth aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, chromium Cr in a range of 0.30% mass to 2.00% mass, at least one selected from the group consisting of: molybdenum Mo in a range of 0.1% mass to 0.4% mass, vanadium V in a range of 0.05% mass to 0.40% mass, niobium Nb in a range of 0.01% mass to 0.06% mass, and titanium Ti in a range of 0.01% mass to 0.06% mass, at least one of: nickel Ni in a range of 0.40% mass to 2.50% mass, and boron B in a range of 0.0010% mass to 0.0030% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to a sixth aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, phosphor in a range of 0.01% mass to 0.05% mass, chromium Cr in a range of 0.30% mass to 2.00% mass, at least one selected from the group consisting of: molybdenum Mo in a range of 0.1% mass to 0.4% mass, vanadium V in a range of 0.05% mass to 0.40% mass, niobium Nb in a range of 0.01% mass to 0.06% mass, and titanium Ti in a range of 0.01% mass to 0.06% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to a seventh aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, phosphor in a range of 0.01% mass to 0.05% mass, chromium Cr in a range of 0.30% mass to 2.00% mass, at least one of: nickel Ni in a range of 0.40% mass to 2.50% mass, and boron B in a range of 0.0010% mass to 0.0030% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

According to an eighth aspect of the present invention, there is provided a piston ring, comprising: a refined steel including: carbon C in a range of 0.20% mass to 0.90% mass, silicon Si in a range of 0.10% mass to less than 0.60% mass, manganese Mn in a range of 0.20% mass to 1.50% mass, phosphor in a range of 0.01% mass to 0.05% mass, chromium Cr in a range of 0.30% mass to 2.00% mass, at least one selected from the group consisting of: molybdenum Mo in a range of 0.1% mass to 0.4% mass, vanadium V in a range of 0.05% mass to 0.40% mass, niobium Nb in a range of 0.01% mass to 0.06% mass, and titanium Ti in a range of 0.01% mass to 0.06% mass, and at least one of: nickel Ni in a range of 0.40% mass to 2.50% mass, and boron B in a range of 0.0010% mass to 0.0030% mass, and a remnant including: iron Fe, and an unavoidable impurity, wherein a parameter A calculated from the following expression (1) based on contents of the Si, Mn and Cr is 9.0 or less: parameter A=8.8 Si+1.6 Mn+1.7 Cr—expression (1), and a parameter B calculated from the following expression (2) based on contents of the C, Si, Mn and Cr is 10.8 or more: parameter B=36 C+4.2 Si+3.8 Mn+4.5 Cr—expression (2).

Other objects and features of the present invention will become understood from the following description with reference to the accompanying drawings and tables.

BRIEF DESCRIPTION OF THE DRAWINGS

FIG. 1A is a plan view of a configuration of a piston ring of the present invention, while FIG. 1B is a partial cross sectional view of the piston ring of the present invention.

DESCRIPTION OF THE PREFERRED EMBODIMENTS

Figure 2:
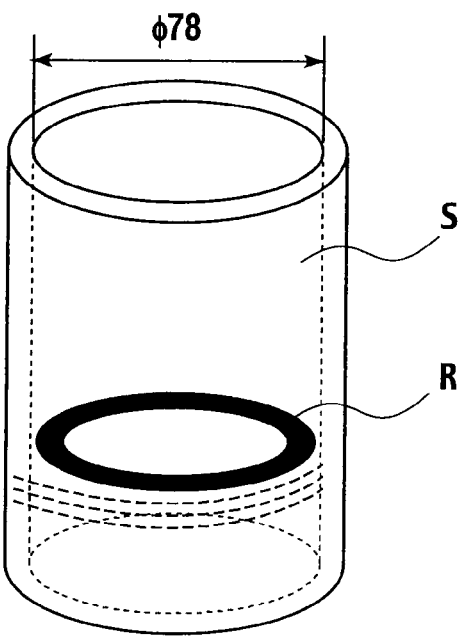
FIG. 2 explains how to implement heat deformation test, according to examples of the present invention.

In the following, a piston ring of the present invention is to be set forth more in detail based on operations of alloy components as well as reasons for numerical limitations to the alloy components, according to an embodiment of the present invention. In this description, "%" denotes mass percentage unless otherwise specified.

The present invention is accomplished by the present inventors who have found out i) proper percentage content of each of components such as C, Si, Mn and Cr, ii) correlation between the above components which correlation may influence thermal conductivity and after-refining hardness, and iii) heat fatigue resistance influenced by hardness.

Specifically, the piston ring of the present invention comprises a refined steel which includes 0.20% to 0.90% of carbon C, 0.10% to less than 0.60% of silicon Si, 0.20% to 1.50% of manganese M, 0.30% to 2.00% of chromium Cr, and a remnant including iron Fe and unavoidable impurity, wherein a parameter A calculated from the following expression (1) based on contents of Si, Mn and Cr is 9.0 or less:

parameter A=8.8 Si+1.6 Mn+1.7 Cr   expression (1), and a parameter B calculated from the following expression (2) based on contents of C, Si, Mn and Cr is 10.8 or more:

parameter B=36 C+4.2 Si+3.8 Mn+4.5 Cr   expression (2)

As such, the piston ring of the present invention has i) heat fatigue resistance which is more excellent than that bought about by a conventional flake graphite cast iron and ii) thermal conductivity which is equivalent to that bought about by the conventional flake graphite cast iron. Especially, the piston ring of the present invention is usable as a second ring.

Hereinabove, especially, C content of 0.25% or more, Si content of 0.40% or less, Mn content of 0.60% or more, Cr content of 0.50% or more and the parameter B of 14.0 or more which is calculated from the expression (2) can bring about more excellent heat fatigue resistance. As such, the present invention can provide a piston ring which is more excellent in thermal conductivity and is equivalent in heat fatigue resistance relative to a conventional ring which is made of heat-resistant spring material and martensite-based stainless steel. Especially, the piston ring of the present invention is applicable to a top ring.

In addition, the piston ring applicable to a top ring can be used as a second ring or an oil ring, without causing any inconvenience.

Hereinafter, the present invention is to be set forth in terms of operations of each of the components as well as reasons for numerical limitations to the respective components.

C (Carbon): 0.20% to 0.90%

C is an element effective for securing heat fatigue resistance after refining (i.e., quench hardening and tempering). Carbon content of 0.20% is required for bringing about such an effect. Too much carbon content is, however, supposed to cause a quench hardening crack, therefore, 0.90% or less is preferred.

Meanwhile, in the case of a piston ring used for a top ring to be applied to a more stringent heat environment, the lower limit of C is preferred to be 0.25% for further improving the heat fatigue resistance.

Si (Silicon): 0.10% to Less than 0.60%

Si features deoxidation and desulfurization in refining operations of steel and is effective for improving heat fatigue resistance when Si is strengthened through a solid solution. For bringing about the above effects, addition of 0.10% or more of Si is necessary. However, too much addition of Si will deteriorate thermal conductivity and machinability, therefore, less than 0.60% of Si is necessary.

Meanwhile, in the case of the piston ring for top ring which is preferred to have a great exhaust heat to a cylinder bore, Si content is preferred to have an upper limit of 0.40% for suppressing deterioration of thermal conductivity.

Mn (Manganese): 0.20% to 1.50%

Mn effectively works as a deoxidizer in refining operations of steel and is effective for securing strength after the refining. For bringing about the above effects, adding Mn of 0.20% or more is necessary. For preventing a possible quench hardening crack which may occur due to too much addition of Mn, however, 1.50% or less is preferable.

Meanwhile, in the case of a piston ring used as a top ring to be applied to a more stringent heat environment, the lower limit of Mn is preferred to be 0.60% for enhancing strength after the refining.

Cr (Chromium): 0.30% to 2.00%

Cr is an element capable of improving tempering softening resistance and is effective for securing strength after the refining. For bringing about the above effects, adding Cr of 0.30% or more is necessary. Too much addition of Cr is, however, costly, therefore, an upper limit is set at 2.00%.

For the piston ring as top ring used under a more stringent heat environment, however, a lower limit of 0.50% is preferable.

P (Phosphor): 0.01% to 0.05%

P is ordinarily an element as an impurity and is capable of increasing hardness and tension strength after P is subjected to a solid solution in ferrite in steel. For bringing about the above effects, adding P of 0.01% or more is necessary. For avoiding a possible machinability deterioration caused by too much amount of P, however, addition of P of 0.05% or less is necessary. For preventing a possible cracks generation during machining because of lower ductility at room temperature, however, 0.03% or less of P is preferable.

Mo (molybdenum): 0.1% to 0.4%
V (vanadium): 0.05% to 0.40%
Nb (niobium): 0.01% to 0.06%
Ti (titanium): 0.01% to 0.06%

Each of the above elements has an operation of improving tempering softening resistance. As such, when necessary, these elements can be added each alone or in an arbitrary combination thereof within the above respective ranges.

That is, Mo added in combination with Cr generates a stable double carbide, to thereby improve tempering softening resistance. For bringing about the above effect, adding 0.1% or more of Mo is necessary. Too much addition of Mo is, however, so costly, thereby defining an upper limit of 0.4%.

Moreover, V in combination with C and N which are included in the steel material generates a stable carbonitride, to thereby improve tempering softening resistance. For bringing about the above effect, adding 0.05% or more of V is necessary. Too much addition of V is, however, so costly, thereby defining an upper limit of 0.40%.

Nb combined with C and N which are include in the steel material can also generate a stable carbonitride, to thereby improve tempering softening resistance. For bringing about the above effect, adding 0.01% or more of Nb is necessary. Too much addition of Nb is, however, so costly, thereby definig an upper limit of 0.06%.

Moreover, Ti in combination with N in the steel material generates a stable double carbide, to thereby improve tempering softening resistance. For bringing about the above effect, adding 0.01% or more of Ti is necessary. Too much addition of Ti is, however, so costly, thereby defining an upper limit of 0.06%.

Ni (nickel): 0.40% to 2.50%
B (boron): 0.0010% to 0.0030%

Each of Ni and B improves quench hardening property and is effective for increasing hardness as refining steel. Therefore, if necessary, at least one of Ni and B can be added within the above respective ranges.

That is, adding Ni presents an effect of increasing quench hardening property. For bringing about the above effect, adding 0.40% or more of Ni is necessary. Too much addition of Ni is, however, so costly, thereby defining an upper limit of 2.5%.

In addition, though B is also effective for improving quench hardening property, adding 0.0010% of B is necessary for bringing about a desired effect. Meanwhile, adding more than 0.0030% of B may deteriorate machinability, thus 0.0030% is defined as an upper limit. Herein, as unavoidable impurities, 0.03% or less of Cu and 0.035% or less of S may be included in the materials of the present invention.

The piston ring as the second ring of the piston for internal combustion engine is supposed to have the compositions within the above respective ranges. In addition, meeting the parameter A of 9.0 or less calculated based on the following expression (1) can bring about thermal conductivity of 36 W/m·K or more after the refining (quench hardening and tempering), which 36 W/m·K or more is equivalent to that brought about by the conventional piston ring including flake graphite cast iron.

$$A = 8.8\,Si + 1.6\,Mn + 1.7\,Cr \quad \text{expression (1)}$$

In addition, meeting the parameter B of 10.8 or more calculated by the following expression (2) generates hardness of 26 HRC or more after the refining (quench hardening and tempering), which can improve heat fatigue resistance by 30% or more, to thereby secure strength and heat fatigue resistance which are necessary for the second ring, thus improving reliability of parts (products).

$$B = 36 C + 4.2 Si + 3.8 Mn + 4.5 Cr \quad \text{expression (2)}$$

Hereinabove, the expression (1) and expression (2) are calculated respectively through multiple regression analyses after a hard study of influence by contents of C, Si, Mn and Cr, where the above influence is interpreted as alloy components' operations influencing thermal conductivity as well as quenched-tempered hardness.

Meanwhile, in terms of the piston ring as top ring of piston of internal combustion engine, having the compositions within the above ranges and meeting the parameter A of 9.0 or less calculated based on the above expression (1) can likewise secure thermal conductivity of 36 W/m·K or more which is 1.4 or more times as large as that brought about by the conventional piston ring made by martensite-based stainless steel. As such, the top ring allows a heat transfer from a piston to a cylinder bore, thus improving fuel economy by 0.2% or more. The parameter A of 7 or less is more preferable.

In addition, meeting the parameter B of 14.0 or more calculated based on the expression (2) can meet base material hardness of 32 HRC or more after quench hardening-tempering (i.e., after refining). As such, strength as top ring and desired heat fatigue resistance can be secured, thus bringing about reliability of parts (products).

The piston ring of the present invention is subjected to the refining, that is, quench hardening-tempering, so as to increase mechanical strength such as resistance as well as fatigue strength. Rendering the quench hardening temperature at 800° C. or more can bring about a complete quench hardening structure, while rendering the tempering temperature at 350° C. or more can prevent a possible strength decrease which may be caused by structure change when the piston ring is being used.

In addition, for securing scuffing resistance and wear resistance, at least an outer peripheral face of the piston ring of the present invention may have a coating which is made of at least one selected from the group consisting of hard chromium plating, hard ceramics and hard carbon. In addition, for the same purpose as above, the outer and inner peripheral faces and upper and lower faces of the piston ring may be subjected to nitriding treatment.

For securing corrosion resistance, at least one of i) the upper and lower faces and ii) inner peripheral face may be subjected to any of oxidizing, chemical conversion coating, resin coating and hard carbon coating.

With the hard coating on the outer peripheral face (sliding face) or the coating on the upper and lower faces through the chemical conversion coating, the thermal conductivity of the piston ring is unlikely to be influenced by the above coatings. Instead, the thermal conductivity of the piston ring is more likely to be influenced by the compositions of materials.

For improving the thermal conductivity of the contact faces of the piston ring of the present invention and for improving aluminum agglutination when the piston ring of the present invention is applied to an aluminum alloy piston, it is preferable to accomplish that at least one of i) the upper and lower faces and ii) the inner peripheral face have a surface roughness, i.e., 10-point mean surface roughness Rz in a range of 0.8 μm to 3.2 μm. Hereinabove, 10-point mean surface roughness Rz is specified in JIS B 0602 (1994).

In addition, the above 10-point mean surface roughness Rz is preferably in a range of 1.0 μm to 2.4 μm and more preferably 1.0 μm to 2.0 μm.

In this case, the above surface treatments, that is, the oxidizing, chemical conversion coating, resin coating, hard coating and the like can improve corrosion resistance, wear resistance, scuffing resistance and the like. In combination with the above surface treatments, the surface roughness can be set in the above ranges.

In addition, even without the above surface treatments, the 10-point mean surface roughness within the above ranges can accomplish an excellent scuffing resistance by the effect of improved thermal conductivity.

With the piston ring of the present invention, the surface roughness of at least one of i) the upper and lower faces and ii) the inner peripheral face is preferred to be kept in a range of 0.8 μm to 3.2 μm, for the following reasons:

1) The surface roughness Rz less than 0.8 μm increases machining cost while failing to bring about a further improved effect.

2) The surface roughness Rz of more than 3.2 μm is likely to damage sealing required for a piston ring.

EXAMPLES

Hereinafter, the present invention is to be set forth more in detail based on examples and comparative examples. The present invention is, however, not limited to the examples.

[Preparation of Piston Ring]

Table 1, table 2 and table 3 show 47 types of alloy steels in total having respective chemical compositions (47: 36 examples and 11 comparative examples). Each of the alloy steels is subjected to a cold working, followed by refining at a quench hardening temperature of 900° C. and a tempering temperature of 400° C., to thereby obtain a wire rod having a rectangular cross section of 1.2 mm×2.5 mm. Then, the wire rod was formed into a ring to meet a bore diameter of 78 mm, followed by cutting of a part for an abutment joint.

Then, a strain-removing heat treatment was implemented under 350° C. for 1.5 hrs., followed by machining of an outer peripheral face Fo, and still followed by a hard chromium plating on the outer peripheral face Fo (examples 1 to 9, comparative examples 1 to 11). In addition, a PVD (physical vapor deposition) coating made of Cr—N-based material (coating compositions by mass %: 95.2% of CrN, 1.0% of $Cr_2N$, 3.8% of Cr) was formed (examples 10 to 18). Then, a hard carbon coating {diamond-like carbon (DLC) coating} was formed on the PVD coating (examples 19 to 27). Then, finishing-machining was implemented, followed by forming of triiron ferroxidized film treatment coating on the upper face Fu and lower face Fl, to thereby complete a piston ring R for internal combustion engine, as shown in FIG. 1A and FIG. 1B.

In addition, the upper face Fu, lower face Fl and inner peripheral face Fi of the ring before each of the surface treatments were each so polished as to have a 10-point surface roughness Rz in a range of 1.3 μm to 2.2 μm.

Then, each of the piston rings prepared according to the examples and comparative examples was subjected to Rockwell hardness tests (C scale) for investigating 400° C. tempered hardness, in parallel with measurement of thermal conductivity by a laser flash method. Then, these piston rings were used for implementing engine performance tests and heat deformation tests. Table 1 and table 2 show results of the above tests.

[Engine Performance Test]

An in-line 4-cylinder engine was used. Each of the above piston rings was fitted to a top ring groove of one of the all cylinders. Then, engine performance tests were implemented for a 30-hr continuous operation from idling to 5500 rpm. Fuel economy improvement ratio (fuel economy up) was calculated based on a top ring which is made by nitriding SUS440C (thermal conductivity: 25.2 W/m·K) and is widely used for a current engine.

[Heat Deformation Test]

Pursuant to JIS B 8032-5, as shown in FIG. 2, each of the above obtained piston rings R was inserted into a sleeve S having a bore diameter of 78 mm, followed by being left at rest at 300° C. for 3 hrs., to thereafter measure tension decline ratios before and after the heating.

Acceptance criteria of the heat fatigue resistance (heat deformation) of the piston ring as a second ring was defined as follows:

Tension decline ratio (standard) of 8.0% or less. This 8.0% or less is for bringing about an effect of improving the heat fatigue resistance by 30% or more, relative to 12% or less of tension decline ratio of the current (conventional) flake graphite cast iron. That is, (12−8)/12=...=33.333%

In addition, acceptance criteria of the heat fatigue resistance (heat deformation) of the piston ring as a top ring was defined as follows:

Tension decline ratio (standard) of 7.5% or less. This 7.5% or less, relative to 8% or less of tension decline ratio pursuant to JIS (B8032-5) associated with the current steel ring, is for bringing about a resistance in a more stringent heat environment.

TABLE 1

| Section | Chemical components (%) | | | | | | | Parameter | | Hardness (HRC) | Thermal conductivity (W/mK) | Fuel economy up (%) | Tension down (%) | Remarks |
|---|---|---|---|---|---|---|---|---|---|---|---|---|---|---|
| | C | Si | Mn | P | Cr | Mo | Ni | A | B | | | | | |
| Example 1 | 0.56 | 0.25 | 0.80 | 0.03 | 0.80 | N/A | N/A | 4.84 | 27.85 | 45.9 | 42.3 | 0.227 | 4.93 | Acceptable |
| Example 2 | 0.40 | 0.35 | 1.00 | 0.01 | 1.80 | N/A | N/A | 7.44 | 27.77 | 45.8 | 37.3 | 0.207 | 4.91 | Acceptable |
| Example 3 | 0.40 | 0.20 | 0.75 | 0.02 | 0.80 | 0.2 | N/A | 4.32 | 21.69 | 40.6 | 43.6 | 0.232 | 6.09 | Acceptable |
| Example 4 | 0.58 | 0.40 | 1.45 | 0.01 | 1.50 | N/A | N/A | 8.39 | 34.82 | 51.0 | 36.5 | 0.203 | 3.54 | Acceptable |
| Example 5 | 0.40 | 0.40 | 1.00 | 0.02 | 1.00 | N/A | N/A | 6.82 | 24.38 | 43.1 | 38.6 | 0.213 | 5.58 | Acceptable |
| Example 6 | 0.24 | 0.10 | 0.60 | 0.01 | 0.50 | N/A | N/A | 2.69 | 13.59 | 30.8 | 49.3 | 0.248 | 7.58 | Acceptable |
| Example 7 | 0.23 | 0.30 | 0.55 | 0.02 | 0.50 | N/A | N/A | 4.37 | 13.88 | 31.3 | 43.4 | 0.231 | 7.53 | Acceptable |
| Example 8 | 0.28 | 0.15 | 0.30 | 0.01 | 0.45 | N/A | N/A | 2.57 | 13.88 | 31.3 | 50.0 | 0.250 | 7.53 | Acceptable |
| Example 9 | 0.22 | 0.20 | 0.25 | 0.03 | 0.30 | N/A | N/A | 2.67 | 11.06 | 26.4 | 49.2 | 0.248 | 7.95 | Acceptable |
| Comparative example 1 | 0.19 | 0.28 | 0.20 | 0.01 | 0.27 | N/A | N/A | 3.24 | 10.00 | 25.4 | 45.8 | 0.237 | 8.03 | Strength unacceptable |
| Comparative example 2 | 1.00 | 0.30 | 1.00 | 0.01 | 1.00 | N/A | N/A | 5.94 | 45.56 | 56.2 | 40.1 | 0.219 | 1.94 | Quenching crack |
| Comparative example 3 | 0.60 | 0.50 | 1.00 | 0.01 | 2.00 | N/A | N/A | 9.40 | 36.50 | 51.6 | 35.5 | 0.197 | 3.35 | Thermal conductivity unacceptable |
| Comparative example 4 | 0.60 | 0.70 | 1.00 | 0.01 | 1.00 | N/A | N/A | 9.46 | 32.84 | 49.3 | 35.0 | 0.195 | 4.04 | Thermal conductivity and machinability unacceptable |
| Comparative example 5 | 0.21 | 0.15 | 0.19 | 0.01 | 0.30 | N/A | N/A | 2.13 | 10.26 | 25.0 | 53.4 | 0.256 | 8.09 | Strength unacceptable |
| Comparative example 6 | 0.60 | 0.30 | 1.60 | 0.01 | 1.00 | N/A | N/A | 6.90 | 33.44 | 49.8 | 38.5 | 0.212 | 3.94 | Quenching crack |
| Comparative example 7 | 0.21 | 0.20 | 0.26 | 0.01 | 0.25 | N/A | N/A | 2.60 | 10.51 | 25.5 | 49.8 | 0.249 | 8.04 | Strength unacceptable |
| Comparative example 8 | 0.54 | 1.45 | 0.70 | 0.01 | 0.70 | N/A | N/A | 15.1 | 31.34 | 48.4 | 31.4 | 0.159 | 4.31 | Thermal conductivity unacceptable |
| Comparative example 9 | 0.90 | 0.64 | 1.50 | 0.01 | 2.05 | N/A | N/A | 11.5 | 50.00 | 58.0 | 34.0 | 0.187 | 1.33 | Thermal conductivity unacceptable |

TABLE 1-continued

| Section | Chemical components (%) | | | | | | | Parameter | | Hardness | Thermal conductivity | Fuel economy | Tension | Remarks |
| --- | --- | --- | --- | --- | --- | --- | --- | --- | --- | --- | --- | --- | --- | --- |
| | C | Si | Mn | P | Cr | Mo | Ni | A | B | (HRC) | (W/mK) | up (%) | down (%) | |
| Comparative example 10 | 0.20 | 0.10 | 0.20 | 0.01 | 0.20 | N/A | N/A | 1.54 | 9.28 | 23.1 | 56.1 | 0.248 | 8.22 | Strength unacceptable |
| Comparative example 11 | 0.85 | 1.00 | 1.00 | 0.01 | 17.00 | N/A | 0.60 | 39.3 | 115.1 | 60.0 | 21.0 | 0.000 | 0.60 | Thermal conductivity unacceptable |

TABLE 2

| Section | Chemical components (%) | | | | | | | Parameter | | Hardness | Thermal conductivity | Fuel economy | Tension | Remarks |
| --- | --- | --- | --- | --- | --- | --- | --- | --- | --- | --- | --- | --- | --- | --- |
| | C | Si | Mn | P | Cr | Mo | Ni | A | B | (HRC) | (W/mK) | up (%) | down (%) | |
| Example 10 | 0.56 | 0.25 | 0.80 | 0.03 | 0.80 | N/A | N/A | 4.84 | 27.85 | 45.9 | 42.2 | 0.227 | 4.93 | Acceptable |
| Example 11 | 0.40 | 0.35 | 1.00 | 0.01 | 1.80 | N/A | N/A | 7.44 | 27.77 | 45.8 | 37.4 | 0.207 | 4.91 | Acceptable |
| Example 12 | 0.40 | 0.20 | 0.75 | 0.02 | 0.80 | 0.2 | N/A | 4.32 | 21.69 | 40.6 | 43.5 | 0.232 | 6.09 | Acceptable |
| Example 13 | 0.58 | 0.40 | 1.45 | 0.01 | 1.50 | N/A | N/A | 8.39 | 34.82 | 51.0 | 36.4 | 0.203 | 3.54 | Acceptable |
| Example 14 | 0.40 | 0.40 | 1.00 | 0.02 | 1.00 | N/A | N/A | 6.82 | 24.38 | 43.1 | 38.5 | 0.213 | 5.58 | Acceptable |
| Example 15 | 0.24 | 0.10 | 0.60 | 0.01 | 0.50 | N/A | N/A | 2.69 | 13.59 | 30.8 | 49.2 | 0.248 | 7.58 | Acceptable |
| Example 16 | 0.23 | 0.30 | 0.55 | 0.02 | 0.50 | N/A | N/A | 4.37 | 13.88 | 31.3 | 43.5 | 0.231 | 7.53 | Acceptable |
| Example 17 | 0.28 | 0.15 | 0.30 | 0.01 | 0.45 | N/A | N/A | 2.57 | 13.88 | 31.3 | 50.1 | 0.250 | 7.53 | Acceptable |
| Example 18 | 0.22 | 0.20 | 0.25 | 0.03 | 0.30 | N/A | N/A | 2.67 | 11.06 | 26.4 | 49.1 | 0.248 | 7.95 | Acceptable |
| Example 19 | 0.56 | 0.25 | 0.80 | 0.03 | 0.80 | N/A | N/A | 4.84 | 27.85 | 45.9 | 42.3 | 0.227 | 4.93 | Acceptable |
| Example 20 | 0.40 | 0.35 | 1.00 | 0.01 | 1.80 | N/A | N/A | 7.44 | 27.77 | 45.8 | 37.2 | 0.207 | 4.91 | Acceptable |
| Example 21 | 0.40 | 0.20 | 0.75 | 0.02 | 0.80 | 0.2 | N/A | 4.32 | 21.69 | 40.6 | 43.5 | 0.232 | 6.09 | Acceptable |
| Example 22 | 0.58 | 0.40 | 1.45 | 0.01 | 1.50 | N/A | N/A | 8.39 | 34.82 | 51.0 | 36.6 | 0.203 | 3.54 | Acceptable |
| Example 23 | 0.40 | 0.40 | 1.00 | 0.02 | 1.00 | N/A | N/A | 6.82 | 24.38 | 43.1 | 38.4 | 0.213 | 5.58 | Acceptable |
| Example 24 | 0.24 | 0.10 | 0.60 | 0.01 | 0.50 | N/A | N/A | 2.69 | 13.59 | 30.8 | 49.4 | 0.248 | 7.58 | Acceptable |
| Example 25 | 0.23 | 0.30 | 0.55 | 0.02 | 0.50 | N/A | N/A | 4.37 | 13.88 | 31.3 | 43.6 | 0.231 | 7.53 | Acceptable |
| Example 26 | 0.28 | 0.15 | 0.30 | 0.01 | 0.45 | N/A | N/A | 2.57 | 13.88 | 31.3 | 50.2 | 0.250 | 7.53 | Acceptable |
| Example 27 | 0.22 | 0.20 | 0.25 | 0.03 | 0.30 | N/A | N/A | 2.67 | 11.06 | 26.4 | 49.3 | 0.248 | 7.95 | Acceptable |

Figure 3:
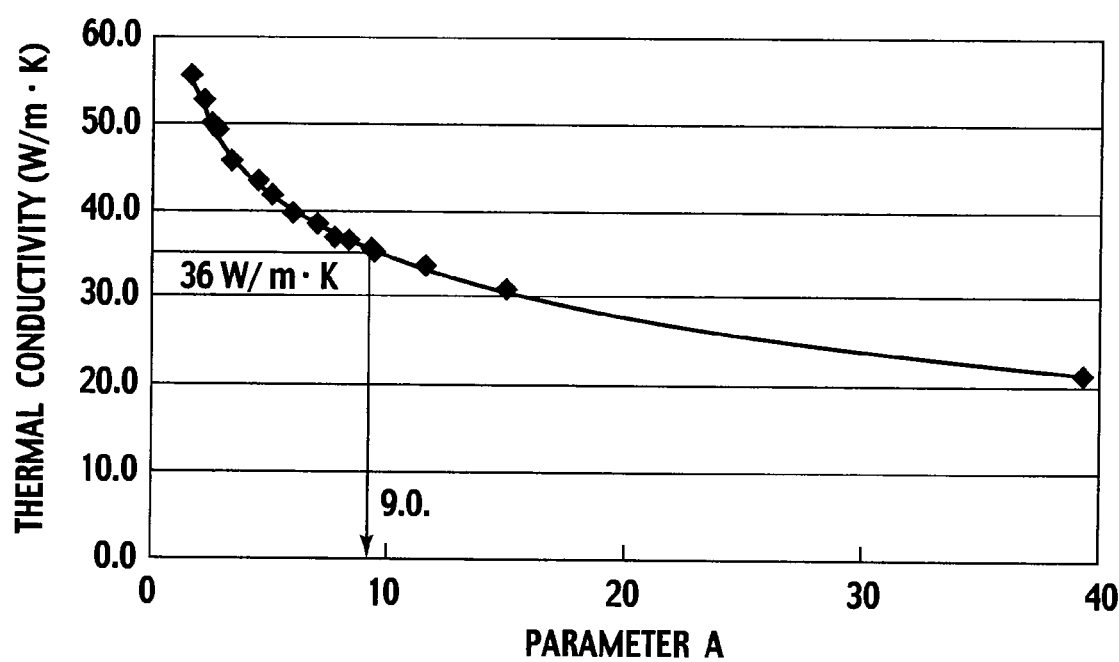
FIG. 3 is a graph showing thermal conductivity relative to a parameter A.

In addition, FIG. 3 shows i) thermal conductivity relative to ii) the parameter A calculated by the expression (1) in view of Si, Mn and Cr contents. Meanwhile, FIG. 4 shows i) fuel economy improvement ratio (fuel economy up) through the engine performance test, relative to ii) thermal conductivity.

Figure 4:
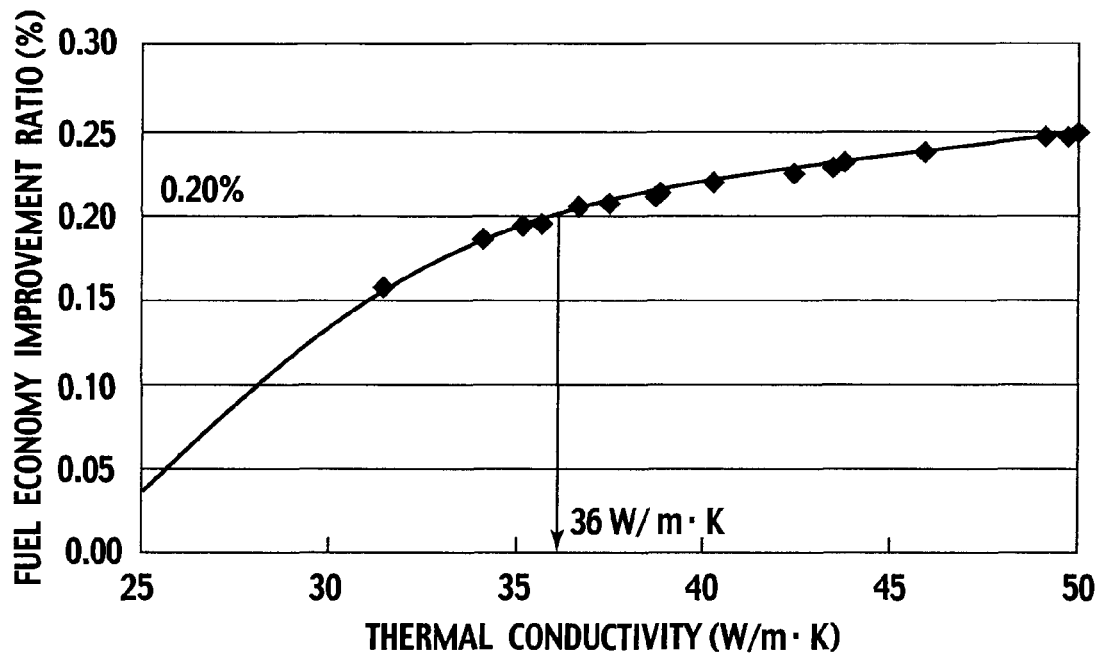
FIG. 4 is a graph showing fuel economy improvement ratio (fuel economy up) relative to a piston ring material's thermal conductivity.

FIG. 4 shows a relation between the thermal conductivity of the piston ring material and the fuel economy improvement ratio. For accomplishing the fuel economy improvement ratio of 0.20% or more, it is obvious from FIG. 4 that the thermal conductivity of 36 W/m·K or more is necessary.

In addition, FIG. 3 shows a relation between the parameter A and the thermal conductivity. It is obvious from FIG. 3 that the parameter A of 9.0 or less brings about the thermal conductivity of 36 W/m·K or more. In other words, it is obvious from FIG. 3 and FIG. 4 that the parameter A of 9.00 or less brings about the fuel economy improvement ratio of 0.20% or more.

Figure 5:
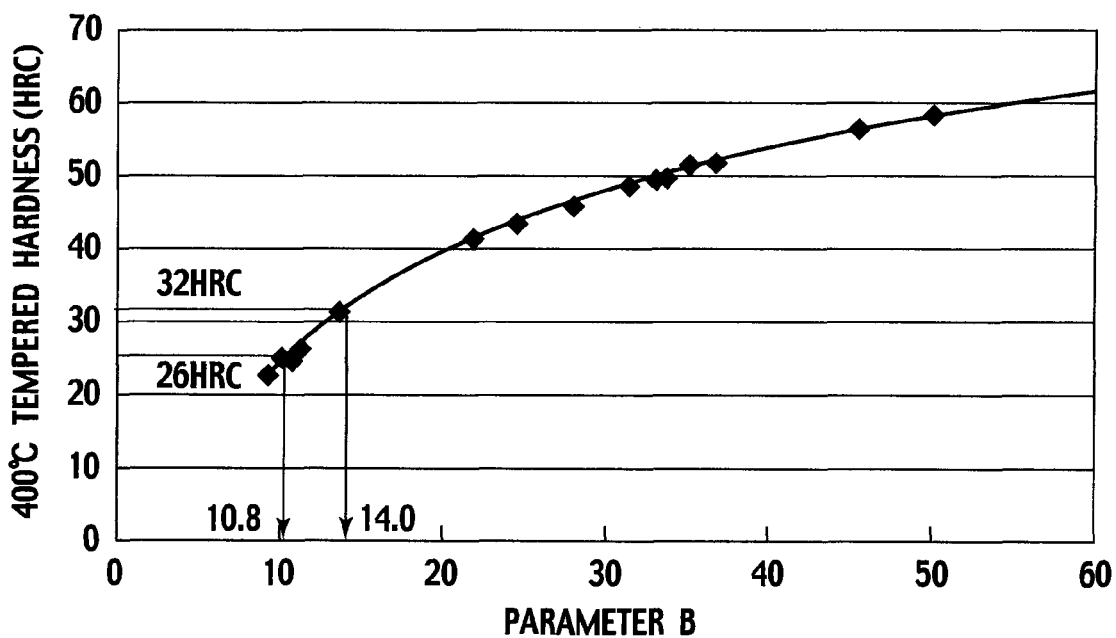
FIG. 5 is a graph showing 400° C. tempered hardness relative to a parameter B.

In addition, FIG. 5 shows i) 400° C. tempered hardness relative to ii) the parameter B calculated by the expression (2) based on C, Si, Mn and Cr contents. Meanwhile, FIG. 6 shows i) tension decline ratios (tension down) after the heat deformation test relative to ii) 400° C. tempered hardness.

Figure 6:
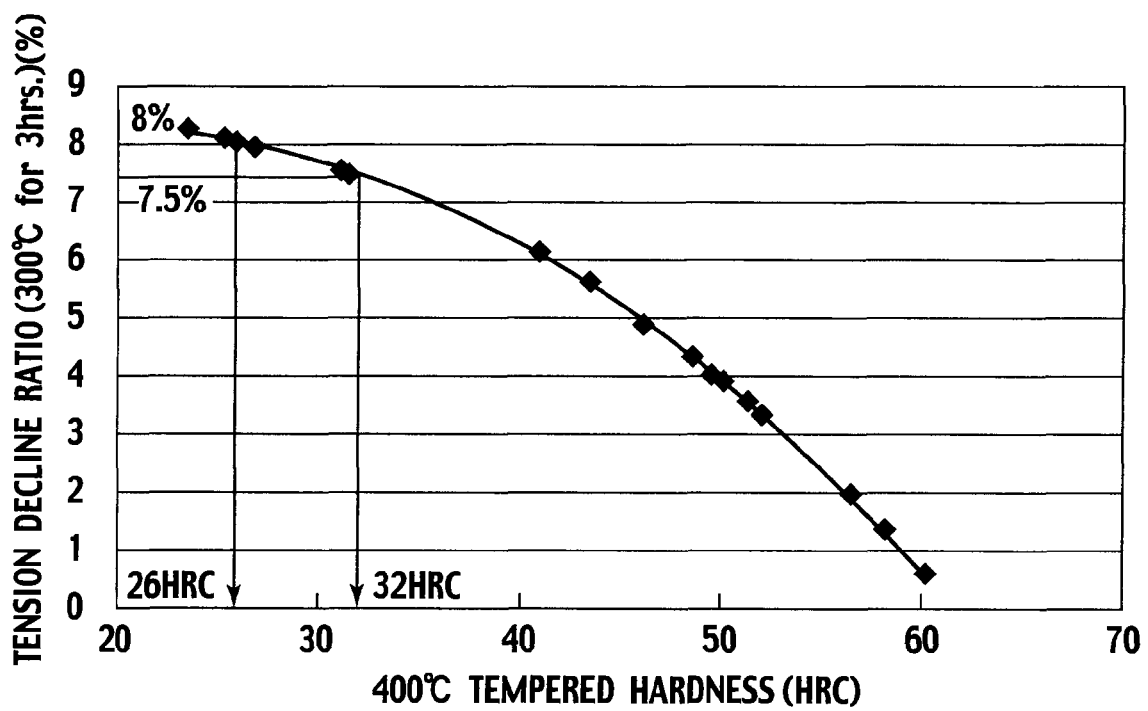
FIG. 6 is a graph showing tension decline ratios (tension down) after heat deformation test relative to 400° C. tempered hardness.

FIG. 5 shows a relation between the parameter B and the 400° C. tempered hardness, while FIG. 6 shows a relation between the 400° C. tempered hardness and the tension decline ratio.

From FIG. 6, it is necessary that 400° C. tempered hardness is 26 HRC or more, so as to obtain a target tension decline ratio of 8.0% or less for a second ring material.

Moreover from FIG. 6, it is necessary that 400° C. tempered hardness is 32 HRC or more, so as to obtain a target tension decline ratio of 7.5% or less for a top ring material.

From FIG. 5, it is necessary that the parameter B is 10.8 or more, so as to obtain 400° tempered hardness of 26 HRC or more of hardness is necessary for the second ring material. Moreover from FIG. 5, it is necessary that the parameter B is 14.0 or more, so as to obtain 400° C. tempered hardness of 32 HRC or more which is necessary for the top ring material.

In other words, the parameter B of 10.8 or more can obtain the tension decline ratio of 8.0% or less for the second ring, while the parameter B of 14.0 or more can obtain the tension decline ratio of 7.5% or less for the top ring.

Examples 28 to 36

Mo, V, Ni, Nb, Ti, P and B were added, alone or in combination, to an alloy steel (0.40% of C, 0.40% of Si, 1.00% of Mn, 0.02% of P and 1.00% of Cr) which is a base steel according to the example 5 shown in table 1, to thereby prepare seven types of alloy steels. Then, through like procedures, the piston rings were prepared. Then, 400° C. tempered hardness was measured likewise, followed by heat deformation tests likewise, to thereby obtain tension decline ratios. The PVD (physical vapor deposition) surface treatment was implemented.

Table 3 shows results of the above tests, where the above alloy steels according to the examples 28 to 36 present hardness more improved than that of the base steel according to the example 5. This proves that adding of any of the above alloys Mo, V, Ni, Nb, Ti, P and B contributes to improvement of the heat fatigue resistance.

the examples 37 to 41 and comparative examples 12 to 16. Herein, some piston ring samples were not subjected to the chemical conversion coating, that is, those samples were sub-

TABLE 3

| Section | Chemical components (%) | | | | | | | | | | | Parameter | | Hardness | Tension | |
|---|---|---|---|---|---|---|---|---|---|---|---|---|---|---|---|---|
| | C | Si | Mn | Cr | Mo | V | Ni | Nb | Ti | P | B | A | B | (HRC) | down (%) | Remarks |
| Example 28 | 0.40 | 0.40 | 1.00 | 1.00 | N/A | N/A | N/A | N/A | N/A | 0.01 | N/A | 6.82 | 24.38 | 43.1 | 5.58 | Hardness up |
| Example 29 | | | | | 0.20 | N/A | N/A | N/A | N/A | 0.03 | N/A | | | 49.2 | 4.08 | Hardness up |
| Example 30 | | | | | N/A | 0.25 | N/A | N/A | N/A | 0.01 | N/A | | | 48.3 | 4.32 | Hardness up |
| Example 31 | | | | | N/A | N/A | 1.0 | N/A | N/A | 0.01 | N/A | | | 45.6 | 5.01 | Hardness up |
| Example 32 | | | | | N/A | N/A | N/A | 0.03 | N/A | 0.01 | N/A | | | 48.3 | 4.32 | Hardness up |
| Example 33 | | | | | N/A | N/A | N/A | N/A | 0.03 | 0.01 | N/A | | | 47.1 | 4.63 | Hardness up |
| Example 34 | | | | | N/A | N/A | N/A | N/A | N/A | 0.02 | N/A | | | 45.3 | 5.24 | Hardness up |
| Example 35 | | | | | N/A | N/A | N/A | N/A | 0.02 | 0.01 | 0.0030 | | | 49.1 | 4.11 | Hardness up |
| Example 36 | | | | | 0.11 | 0.05 | 0.5 | 0.02 | 0.02 | 0.02 | 0.0010 | | | 51.2 | 3.20 | Hardness up |

Examples 37 to 46 and Comparative Examples 12 to 16

Piston rings were prepared by using the alloy steel (0.56% of C, 0.25% of Si, 0.80% of Mn, 0.03% of P and 0.80% of Cr) of the example 1 shown in table 1. Likewise, piston rings were prepared by using the alloy steel (0.54% of C, 1.45% of Si, 0.70% of Mn, 0.01% of P and 0.70% of Cr) of the example 8. The thus prepared piston rings were each fitted to a piston made of AC 8A material, so as to investigate aluminum agglutination influenced by surface roughness of the piston ring.

That is, after each of the above steels was subjected to a cold working, refining (i.e., quench hardening and tempering) was likewise repeated to thereby prepare a wire rod. Then, the wire rod was formed into a ring. Then, the strain-removing heat treatment was likewise implemented. Then, the outer peripheral face was machined, while the upper face, lower face and inner peripheral face (Fi) were polished so that the upper face, lower face and inner peripheral face (Fi) each have 10-point mean surface roughness Rz in a range of 0.8 μm to 3.2 μm.

Then, the thus obtained samples were dipped in a heated strong alkali salt solution so as to each form a triiron ferroxidized film treatment coating, to thereby obtain piston rings of the examples 37 to 41 and comparative examples 12 to 16. Herein, some piston ring samples were not subjected to the chemical conversion coating, that is, those samples were subjected only to the polishing for varying the surface roughness of each of the upper face, lower face, inner peripheral face, to thereby obtain piston rings free from the triiron ferroxidized film treatment coating (examples 42 to 46).

Each of the above piston rings (examples 37 to 46 and comparative examples 12 to 16) was subjected to a wear test using a wear tester as set forth in Japanese Patent Application Laid-Open No. 2008-76132 {=JP2008076132 (A)}, which is incorporated herein by reference, in a condition that temperature of an upper end face which is a part corresponding to the piston was set around 150° C. Time was measured until each of the piston rings is agglutinated to an aluminum alloy piston.

Table 4 shows results of the tests. In table 4, agglutination time was measured relative to the comparative example 14's agglutination time of 1.0 which is a standard.

TABLE 4

| Section | Chemical components (%) | | | | | Surface roughness | Triiron tetroxide | Aluminium agglutination |
|---|---|---|---|---|---|---|---|---|
| | C | Si | Mn | P | Cr | Rx | coating | time ratio |
| Example 37 | 0.56 | 0.25 | 0.80 | 0.03 | 0.80 | 0.8 | Yes | 1.7 |
| Example 38 | | | | | | 1.2 | Yes | 1.6 |
| Example 39 | | | | | | 1.6 | Yes | 1.5 |
| Example 40 | | | | | | 2.4 | Yes | 1.2 |
| Example 41 | | | | | | 3.2 | Yes | 1.0 |
| Example 42 | | | | | | 0.8 | No | 1.7 |
| Example 43 | | | | | | 1.2 | No | 1.6 |
| Example 44 | | | | | | 1.6 | No | 1.5 |
| Example 45 | | | | | | 2.4 | No | 1.2 |
| Example 46 | | | | | | 3.2 | No | 1.0 |
| Comparative example 12 | 0.54 | 1.45 | 0.70 | 0.01 | 0.70 | 0.8 | Yes | 1.2 |
| Comparative example 13 | | | | | | 1.2 | Yes | 1.1 |
| Comparative example 14 | | | | | | 1.6 | Yes | 1.0 |
| Comparative example 15 | | | | | | 2.4 | Yes | 0.8 |
| Comparative example 16 | | | | | | 3.2 | Yes | 0.6 |

FIG. 4 shows that, relative to the comparative example 14 (Rz=1.6 μm), the example 41 (Rz=3.2 μm) shows substantially an equivalent result (aluminum agglutination time ratio of 1.0). It was also confirmed that, with the same surface roughness, examples each having certain chemical components (0.56% of C, 0.25% of Si, 0.80% of Mn, 0.03% of P and 0.80% of Cr) are more excellent in agglutination resistance than the comparative examples.

In addition, the examples 37 to 40 having further smaller surface roughness than that of the example 41 have improved agglutination resistance, not only the improved surface roughness. Moreover, it was confirmed that, i) the results of the examples 37 to 41 and ii) the results of the examples 42 to 46 each show an effect brought about by having smaller surface roughness, irrespective of the surface treatment.

Although the present invention has been described above by reference to a certain embodiment and examples, the present invention is not limited to the embodiment and examples described above. Modifications and variations of the embodiment and examples described above will occur to those skilled in the art, in light of the above teachings.

This application is based on a prior Japanese Patent Application No. P2008-053078 (filed Mar. 4, 2008 in Japan) and a prior Japanese Patent Application No. P2008-317984 (filed Dec. 15, 2008 in Japan). The entire contents of the Japanese Patent Applications No. P2008-053078 and P2008-317984 from which priorities are claimed are incorporated herein by reference, in order to take some protection against translation errors or omitted portions.

The scope of the present invention is defined with reference to the following claims.

What is claimed is:

1. A piston ring, comprising:
a refined steel consisting essentially of:
carbon C in a range of 0.20% mass to 0.90% mass,
silicon Si in a range of 0.10% mass to less than 0.60% mass,
manganese Mn in a range of 0.20% mass to 1.50% mass,
chromium Cr in a range of 0.30% mass to 2.00% mass, and
iron Fe as a balance of the refined steel,
wherein a parameter A calculated from the following expression (1) based on contents of the Si, Mn and Cr is 9.0 or less:

parameter A=8.8 Si+1.6 Mn+1.7 Cr     expression (1), wherein a parameter B calculated from the following expression (2) based on contents of the C, Si, Mn and Cr is 10.8 or more:

parameter B=36 C+4.2 Si+3.8 Mn+4.5 Cr     expression (2), wherein the piston ring has a hardness of 26 HRC to 51.2 HRC after a refining including a quench hardening and a tempering, and
wherein the piston ring has a thermal conductivity of 36 W/mK or more after the refining including the quench hardening and the tempering.

2. The piston ring according to claim 1,
wherein at least an outer peripheral face of the piston ring includes a hard coating layer which is at least one selected from the group consisting of:
a hard chromium plating,
a hard ceramic, and
a hard carbon.

3. A piston ring, comprising:
a refined steel consisting essentially of:
carbon C in a range of 0.20% mass to 0.90% mass,
silicon Si in a range of 0.10% mass to less than 0.60% mass,
manganese Mn in a range of 0.20% mass to 1.50% mass,
phosphorus in a range of 0.01% mass to 0.05% mass,
chromium Cr in a range of 0.30% mass to 2.00% mass,
at least one selected from the group consisting of:
molybdenum Mo in a range of 0.1% mass to 0.4% mass,
vanadium V in a range of 0.05% mass to 0.40% mass,
niobium Nb in a range of 0.01% mass to 0.06% mass, and
titanium Ti in a range of 0.01% mass to 0.06% mass, and
iron Fe as a balance of the refined steel,
wherein a parameter A calculated from the following expression (1) based on contents of the Si, Mn and Cr is 9.0 or less:

parameter A=8.8 Si+1.6 Mn+1.7 Cr     expression (1), wherein a parameter B calculated from the following expression (2) based on contents of the C, Si, Mn and Cr is 10.8 or more:

parameter B=36 C+4.2 Si+3.8 Mn+4.5 Cr     expression (2), wherein the piston ring has a hardness of 26 HRC to 51.2 HRC after a refining including a quench hardening and a tempering, and
wherein the piston ring has a thermal conductivity of 36 W/mK or more after the refining including the quench hardening and the tempering.

4. The piston ring according to claim 3,
wherein at least an outer peripheral face of the piston ring includes a hard coating layer which is at least one selected from the group consisting of:
a hard chromium plating,
a hard ceramic, and
a hard carbon.

5. A piston ring, comprising:
a refined steel consisting essentially of:
carbon C in a range of 0.20% mass to 0.90% mass,
silicon Si in a range of 0.10% mass to less than 0.60% mass,
manganese Mn in a range of 0.20% mass to 1.50% mass,
phosphorus in a range of 0.01% mass to 0.05% mass,
chromium Cr in a range of 0.30% mass to 2.00% mass,
at least one of:
nickel Ni in a range of 0.40% mass to 2.50% mass, and
boron B in a range of 0.0010% mass to 0.0030% mass, and
iron Fe as a balance of the refined steel,
wherein a parameter A calculated from the following expression (1) based on contents of the Si, Mn and Cr is 9.0 or less:

parameter A=8.8 Si+1.6 Mn+1.7 Cr     expression (1), wherein a parameter B calculated from the following expression (2) based on contents of the C, Si, Mn and Cr is 10.8 or more:

parameter B=36 C+4.2 Si+3.8 Mn+4.5 Cr     expression (2), wherein the piston ring has a hardness of 26 HRC to 51.2 HRC after a refining including a quench hardening and a tempering, and
wherein the piston ring has a thermal conductivity of 36 W/mK or more after the refining including the quench hardening and the tempering.

6. The piston ring according to claim 5,
wherein at least an outer peripheral face of the piston ring includes a hard coating layer which is at least one selected from the group consisting of:

a hard chromium plating,
a hard ceramic, and
a hard carbon.

7. A piston ring, comprising:

a refined steel consisting essentially of:
- carbon C in a range of 0.20% mass to 0.90% mass,
- silicon Si in a range of 0.10% mass to less than 0.60% mass,
- manganese Mn in a range of 0.20% mass to 1.50% mass,
- phosphorus in a range of 0.01% mass to 0.05% mass,
- chromium Cr in a range of 0.30% mass to 2.00% mass,
- at least one selected from the group consisting of:
  - molybdenum Mo in a range of 0.1% mass to 0.4% mass,
  - vanadium V in a range of 0.05% mass to 0.40% mass,
  - niobium Nb in a range of 0.01% mass to 0.06% mass, and
  - titanium Ti in a range of 0.01% mass to 0.06% mass,
- at least one of:
  - nickel Ni in a range of 0.40% mass to 2.50% mass, and
  - boron B in a range of 0.0010% mass to 0.0030% mass, and
- iron Fe as a balance of the refined steel, wherein a parameter A calculated from the following expression (1) based on contents of the Si, Mn and Cr is 9.0 or less:

$$\text{parameter } A = 8.8\,Si + 1.6\,Mn + 1.7\,Cr \quad \text{expression (1)},$$

wherein a parameter B calculated from the following expression (2) based on contents of the C, Si, Mn and Cr is 10.8 or more:

$$\text{parameter } B = 36\,C + 4.2\,Si + 3.8\,Mn + 4.5\,Cr \quad \text{expression (2)},$$

wherein the piston ring has a hardness of 26 HRC to 51.2 HRC after a refining including a quench hardening and a tempering, and wherein the piston ring has a thermal conductivity of 36 W/mK or more after the refining including the quench hardening and the tempering.

8. The piston ring according to claim 7, wherein at least an outer peripheral face of the piston ring includes a hard coating layer which is at least one selected from the group consisting of:
a hard chromium plating,
a hard ceramic, and
a hard carbon.

\* \* \* \* \*

UNITED STATES PATENT AND TRADEMARK OFFICE
CERTIFICATE OF CORRECTION

PATENT NO.       : 8,592,050 B2
APPLICATION NO.  : 12/397027
DATED            : November 26, 2013
INVENTOR(S)      : Ogawa et al.

Page 1 of 1

It is certified that error appears in the above-identified patent and that said Letters Patent is hereby corrected as shown below:

In the Claims

Column 15, Line 26-52

Replace claim 1 with the following:

1. A piston ring, comprising:
a refined steel consisting essentially of:
carbon C in a range of 0.20 % mass to 0.90 % mass,
silicon Si in a range of 0.10 % mass to less than 0.60 % mass,
manganese Mn in a range of 0.20 % mass to 1.50 % mass,
phosphorus P in a range of 0.01 % mass to 0.05 % mass,
chromium Cr in a range of 0.30 % mass to 2.00 % mass, and
iron Fe as a balance of the refined steel,
wherein a parameter A calculated from the following expression (1) based on contents of the Si, Mn and Cr is 9.0 or less:
parameter A = 8.8 Si + 1.6 Mn + 1.7 Cr --- expression (1),
wherein a parameter B calculated from the following expression (2) based on contents of the C, Si, Mn and Cr is 10.8 or more:
parameter B = 36 C + 4.2 Si + 3.8 Mn + 4.5 Cr --- expression (2),
wherein the piston ring has a hardness of 26 HRC to 51.2 HRC after a refining including a quench hardening and a tempering, and
wherein the piston ring has a thermal conductivity of 36 W/mK or more after the refining including the quench hardening and the tempering.

Signed and Sealed this
Twenty-second Day of July, 2014

Michelle K. Lee
*Deputy Director of the United States Patent and Trademark Office*